2,265,957

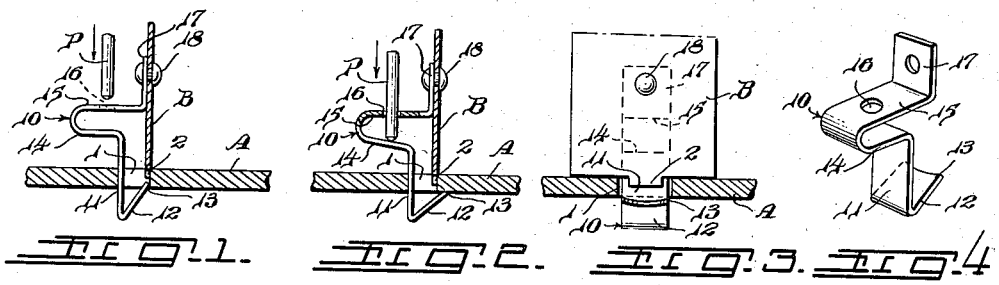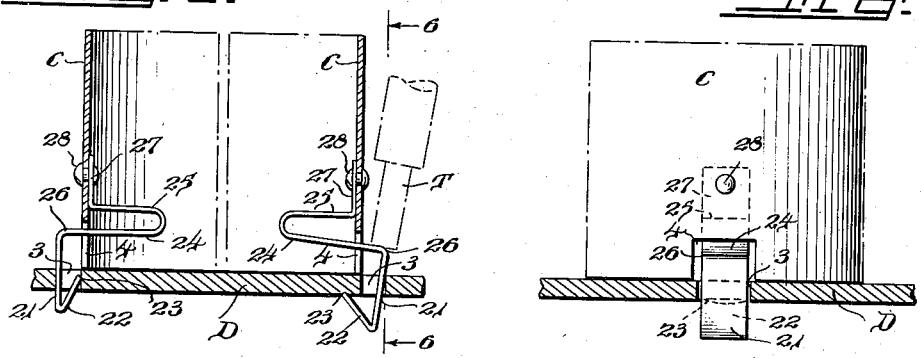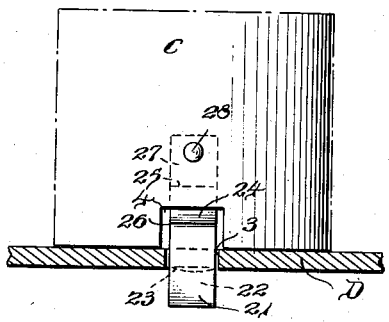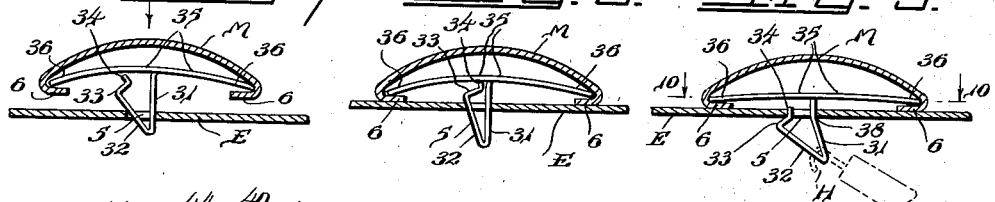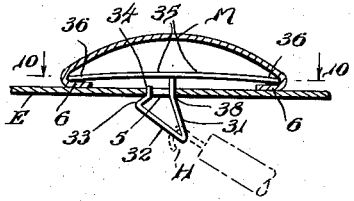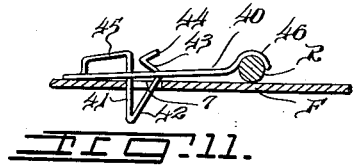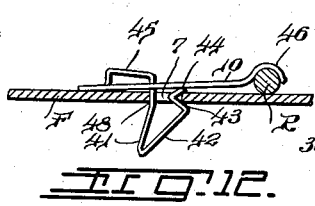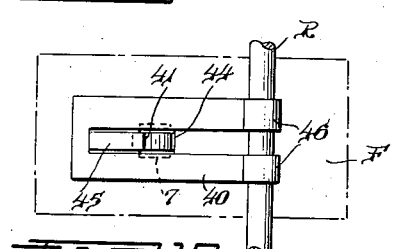
Inventor
GEORGE A. TINNERMAN Patented Dec. 9, 1941

UNITED STATES PATENT OFFICE 2,265,957

LOCKING FASTENER

George A. Tinnerman, Cleveland, Ohio, assignor to Tinnerman Products, Inc., Cleveland, Ohio, a corporation of Ohio Application November 20, 1940, Serial No. 366,472

7 Claims. (Cl. 85—5)

This invention relates in general to improvements in fastening installations wherein an object or part is secured to an apertured support by a spring clip fastener involving a novel principle for providing a positive locked securing action thereof in applied fastening position.

More particularly, the invention is directed to a spring clip fastener which may be constructed in different forms for various applications and uses, but in any case, is adapted to provide a positive locked securing action in a work aperture and otherwise reliably fasten the parts of an assembly under continuously effective spring tension against loosening or displacement even under extreme conditions of shock, vibratory motion, and the like.

Heretofore, it has been the usual practice to design a spring clip device with a stud or shank having a substantial snap fastening action in an aperture in a support at the same time the part secured thereby is applied to its final, predetermined assembled relation with the support. Under the speed required in present day mass production methods, arrangements of this character have been found to result in an entirely inordinate number of faulty, loose installations which, of course, are objectionable in requiring special corrective measures before passing inspection.

Generally speaking, any such faulty installation is due to the fact that if the clip shank is properly received in the work aperture, the part or object secured thereby is not correctly positioned on the support; or, if such part or object is in proper position on the support, the clip shank does not effectively engage in the work aperture in the manner intended, thereby resulting in a loose, improperly secured installation in which the respective parts are subject to objectionable displacement and disassociation from assembled relation.

Such objectionable features and insufficiencies of the prior art structures are overcome in the application and use of the fasteners of the present invention which involve an arrangement wherein no attempt is made to effect a fastening action of the securing means at the same time the object or part is applied to assembled relation on the support, but rather, a m ou embodying the separate and distinct steps of first applying such object or part to predetermined assembled relation on the support with the clip shank in position to be secured in an opening therein, and then, after the parts of the assembly have been precisely and exactly located, actuating the clip shank in a manner to lock the same in such opening and fixedly and rigidly secure the parts of the assembly.

A principal object of the invention, therefore, is to provide an improved fastening means of this character which may be provided for various types of installations and embodying a clip shank construction that is intended to be forcibly applied to positive locked engagement in a work aperture following the assembly of the parts of the installation in exact, predetermined relation, and further, to secure the parts in such relation under continuously effective spring tension against loosening, displacement or disassociation.

A further object of the invention is to provide a spring fastener construction of the kind described comprising a clip shank or securing portion adapted to be forcibly applied to an aperture in a support, as aforesaid, an attaching portion for attaching the fastener to an object or part to be secured to said support, and a resilient, yieldable connecting portion joining said securing and attaching portions in a manner to permit the clip shank to be actuated generally axially to fastening position in said aperture and locked therein against withdrawal or reverse movement tending toward loosening or separation of the members of the assembly.

Another, more specific object of the invention is to provide various forms of such fastening means in the manner of simple, one-piece, sheet metal clip devices which are cheap and inexpensive to provide and lend themselves to economical quantity production in that they may be produced at relatively low cost from ordinary sheet metal strip stock with little loss or waste of material.

Further objects and advantages, and other new and useful features in the construction, arrangement and general combination of parts of the invention will be readily apparent to those skilled in the art as a description thereof proceeds with reference to the accompanying drawing, for purposes of illustration but not of limitation, in which like reference characters designate like parts throughout the same, and in which:

Fig. 1 is a vertical sectional view of an installation in accordance with the invention embodying one form of the improved locking fastener shown in the initially applied position thereof for securing the installation;

Fig. 2 is a similar view showing the fastener in final applied position;

Fig. 3 is a side view looking from the right of

Fig. 2, the support being represented in section; and,

Fig. 4 is a perspective of the fastener per se shown employed in Figs. 1 to 3 inclusive.

Fig. 5 is a vertical sectional view of an installation for mounting a container, or the like, by another form of the improved locking fastener; and, Fig. 6 is a side view taken along line 6—6 of Fig. 5.

Figs. 7 to 9 inclusive illustrate the several steps in the application of another form of the locking fastener for securing a molding installation or the like, Fig. 7 being a sectional view of such an installation with the shank of the fastener shown in position for entering the opening in the support;

Fig. 8 is a similar view showing the molding in assembled relation on the support and the position of the fastener shank as initially applied to the opening therein;

Fig. 9 is a view corresponding to Fig. 8 and showing the fastener shank in final applied locking relation in such opening in the support; and, Fig. 10 is a sectional view taken on line 10—10 of Fig. 9 looking in the direction of the arrows.

Fig. 11 illustrates a further form of locking fastener for mounting a rod, cable or similar object on a support, the fastener being shown in initially applied position;

Fig. 12 is a view similar to Fig. 11 showing the fastener in final applied position; and, Fig. 13 is a top plan view of the completed installation shown in Fig. 12.

Referring now, more particularly, to the drawing Figs. 1 to 3 inclusive show a fastening installation of general utility in which any two cooperating parts A, B, may be secured in generally normal relation to each other by a simple, inexpensive form of the fastener such as shown in Fig. 4, for example. The part A represents the support which is usually in the form of a panel, or the like, and is provided with an opening 1 for receiving the shank or holding portion of the fastener as shown in Fig. 1. The part B designates the secured portion of any article or object to be fastened to the support A in generally normal relation thereto and locked against shifting, displacement or disassociation of said parts from assembled relation. If desired, said part B may be provided with a positioning lug or similar element 2 extending from the lower edge thereof as best seen in Fig. 3 and receivable in said opening 1 in the support in the predetermined assembled relation of said parts A, B.

Said opening 1, may be of round, rectangular or other suitable outline so long as it is of a size proportionate to the dimensions of the shank or holding portion of the fastener to provide for an interlocking relation thereof in said opening. In this respect, said positioning lug 2 is designed to be received in such round or rectangular opening in firm, rigid, engagement with a side wall thereof at the same time the holding shank also is received in said opening in the initial step of securing said parts A, B, as presently to be described.

The fastener in this form of the invention, designated generally 10, Fig. 4, is a simple formed, inexpensive device which may be constructed of any suitable sheet metal material, preferably spring metal or cold rolled metal having spring-like characteristics. The device may be formed from blanks of various outlines, of course, but from a quantity production standpoint, is most advantageously provided from a comparatively small, generally rectangular blank which may be obtained from ordinary sheet metal strip stock with little loss or waste of material.

The metal strip is provided of a width to be received in the opening 1 in the support and is bent to define a shank or holding portion comprising a leg 11 and tongue 12 or similar yieldable element integrally united therewith at the leading end thereof. Said tongue 12 otherwise is provided in a manner whereby the extremity thereof defines a locking shoulder which extends from said leg member 11 a distance greater than the size of said opening 1 in the support and includes one or more anchoring points or teeth 13 provided thereon in any suitable manner. The substantial mid-portion of the strip adjacent said shank leg 11 is formed into a return bend defining a U-shaped connecting portion comprising spaced, generally parallel and relatively yieldable arms 14, 15, extending from said shank leg 11 in a direction opposed to said tongue or yieldable locking element 12. Said upper arm 15 preferably is formed with a tool recess 16 and the outer free end portion thereof bent to provide an attaching portion 17.

As shown in Fig. 1, the fastener thus provided is united to the part or object B through said attaching portion 17 by any suitable means such as rivets 18 or equivalent screws, welding, or the like attaching means. The fastener otherwise is so attached to part B, that in the assembled relation thereof on part A, the leading end of shank leg 11 is received in the opening 1 without the extremity of the yieldable tongue element 12 passing through said opening. In this respect, the lower edge of part B firmly and rigidly rests upon the adjacent surface of the support and if the same includes the positioning lug 2, such lug also is received in said opening in engagement with the adjacent wall thereof. The shank leg 11 engages the opposite wall of said opening as the cooperating yieldable tongue element 12 is compressed toward said leg as necessary to be received in said opening in the initial application of the fastener shank thereto, as shown in Fig. 1, with the parts A, B disposed in their predetermined proper assembled relation, but without the locking shoulder defined by the extremity of tongue 12 passing through said opening, as aforesaid.

The arm 15 of the U-shaped connecting portion of the fastener is more or less rigidly disposed with respect to part B by the attaching portion 17 while the cooperating relatively yieldable arm 14 carries the shank leg 11 in a manner whereby said shank may be easily and quickly actuated in a generally axial direction to project the tongue 12 thereof through the opening 1 in part A to substantially the position shown in Fig. 2. This can be effected by any suitable tool applied to the yieldable arm 14 but preferably by a device embodying a substantial pin P which may be passed through the tool recess 16 in the arm 15 and pushed against cooperating relatively yieldable arm 14 in such a manner that the shank leg carried thereby is easily and quickly actuated in a generally axial direction a distance sufficient for the extremity of tongue 12 to clear the opening. Said tongue 12 is thereupon free to spring outwardly to its normal untensioned relation wherein the extremity thereof extends beyond the edges of the opening and defines a shoulder adapted to positively engage the adjacent rearward face of the support A as shown in Fig. 2.

When said tool P is withdrawn and the attendant pressure removed from the arm 14 of the fastener, said arm attempts to assume its initial position carrying the shank 11 and tongue 12 therewith in a reverse axial direction. This forces the pointed prongs or anchoring teeth 13 on the tongue extremity to dig into locked embedded relation with the rearward face of the support under tension of said spring arm 14 and thereby prevent any loosening or displacement of the shank from applied fastening position in the opening.

Inasmuch as the lower edge of part B rests firmly upon the opposite upper face of the support A as shown in Fig. 3, such locked embedded relation of the anchoring teeth 13 under the continuously effective spring force of tensioned arm 14, serves also to minimize any possibility of slight shifting of said part B from its initially secured position on the support. In a further respect, if said part B includes the positioning lug 2 received in the opening 1 in the support, the shank leg 11 engages a wall of said opening and resiliently urges and maintains such positioning lug 2 in engagement with an opposite wall thereof, wherefore the part or object B is thus maintained against any possible shifting or displacement from its proper assembled relation on the support, while the installation otherwise is secured in a positive locking action by the shoulder defined by the extremity of tongue 12 or similar yieldable element, as aforesaid.

Removal of the fastener and disassociation of the parts of the assembly may be effected by applying a suitable tool to the tongue 12 at the rearward side of the support and compressing said tongue toward the shank leg 11 as necessary for the extremity thereof to be received in the opening 1, as shown in Fig. 1, whereupon the fastener shank or holding portion may be withdrawn from said opening and the secured part B easily and quickly separated from the support A.

Figs. 5 and 6 show a form of the locking fastener which is similar in operation and use to that just described and embodies an advantageous construction which is particularly suited for detachably securing a hollow container, or the like, to a supporting part without an unsightly or otherwise objectionable projecting relation of the fasteners externally of the container. In the present example, a condenser can C, of the type commonly used in radio apparatus, for instance, is shown positioned on the supporting panel D and provided with a plurality of spaced locking fasteners designed to be attached to the interior walls of the container with the shank legs 21 thereof extending outwardly of the container in position to be easily and quickly applied to correspondingly spaced openings 3 in said panel D.

The shank or holding portion of each such locking fastener includes a shank leg 21 having at one end a locking tongue 22 preferably provided with anchoring prongs or teeth 23 on the extermity thereof and defining a locking shoulder designed for operation and use in a manner similar to the form described with reference to Figs. 1 to 4 inclusive. Said shank is carried by a return bent, resilient, U-shaped connecting portion comprising spaced arms 24, 25, of unequal length positioned within the container. The longer arm 24 is a spring arm passing through a suitable slot 4 in the lower edge of the container, as best seen in Fig. 6, and defining an external abutment 26 against which any suitable tool, T represented in dotted lines Fig. 5, may be applied to actuate the shank of the fastener axially to final applied fastening position. The free end portion of the fastener adjacent arm 25 is bent to provide an attaching portion 27 which may be secured to the interior wall of the container by rivets 28 or equivalent screws, welding or the like attaching means.

The container is thus provided with fastening means in a manner whereby the same may be assembled on the supporting panel D with the shanks of the fasteners, as shown to the left in Fig. 5, being received in the openings 3 but without the extremities of the tongues 22 thereof passing through said openings. The container is thereby capable of being accurately and precisely positioned on the supporting panel prior to the operation by which the shanks of the fasteners are actuated to locked relation in the openings therein, as shown to the right in Fig. 5, upon application of the tool to the external abutment 26 of each fastener. In this relation, the locking action of the tongues 22, and the operation of the fasteners in general, is substantially similar to that described with reference to Figs. 1 to 3 inclusive, and inasmuch as the shank legs 21 are adapted to engage the respective outer walls of the openings 3 in opposing relation to each other, the container C or other similar object is fixedly and rigidly secured against any possible shifting or displacement from its proper assembled relation on the supporting panel, even under conditions of shock, vibratory motion and the like.

Figs. 7 to 10 inclusive show a further embodiment of the invention in which the locking fastener is provided in a form for securing a molding M, or like object, onto an apertured supporting panel E having an opening 5 receiving the shank of the fastener. The fastener may be constructed from a simple rectangular blank of a size adapted for interlocking relation with the inturned flanges 6, of the molding in any suitable manner. The blank body preferably is of generally bowed configuration when normally untensioned and is formed with spaced longitudinal slits, as seen in Fig. 10, to define an integral strip section which is struck outwardly therefrom and bent to provide the shank leg 31 and yieldable locking tongue or leg element 32. The extremity of said yieldable locking element is provided with a bent portion forming a inclined cam shoulder 33 and, preferably, a cooperating lip 34. The generally bowed body of the fastener defines yieldable spring arms 35 extending generally normal to the shank of the fastener as a connecting portion between said shank and the attaching portions provided by the end sections 36 designed for interlocked attached relation with the flanges 6 of the molding, as aforesaid.

It will be understood that the molding is provided with as many fasteners in spaced relation as are necessary to secure the same evenly and uniformly to the support along the path which it extends in mounted position. The supporting panel E is provided with a suitable number of spaced openings 5 for this purpose and the fasteners are attached to the molding in a manner to locate the shanks thereof in a spaced relation corresponding to that of said openings. Since the body of a fastener is of generally bowed configuration, the spring arms 35 defined thereby may be designed to be flexed to urge the attaching portions 36 thereof into frictionally and resiliently retained interlocked relation with the inturned flanges 6 of the molding. This serves to retain the clips in any predetermined assembled relation with the molding to provide an important advantage in mass production inasmuch as a plurality of moldings can thus be prepared and piled ready for use with the assurance that the shanks of the fasteners will be in proper registry with the openings in the supporting panel when the operation of mounting the molding is undertaken.

The shank of the fastener is initially applied to its associated opening 5 in the support E substantially as shown in Fig. 7. Movement of the molding to the position shown in Fig. 8 disposes the molding in proper assembled relation on the support and causes a gradual compression in the opening of the yieldable leg element 32 toward the shank leg 31, but such movement is not sufficient to effect a locking of the fastener shank in such opening. As illustrated in Fig. 9, this is easily and quickly effected by a separate operation in which a substantially axial force is applied to the fastener shank to cause the cam shoulder 33 to pass through the opening 5 and engage the lower corner thereof and surface adjacent thereto at the rearward side of the support. Preferably a tool having a hook H is employed for this purpose, and the hook engaged in the bight of the loop defined by the cooperating legs 31, 32, as represented in dotted lines in Fig. 9. A pronounced axial pull may thus be exerted on the shank to cause the cam shoulder 33 to clear the opening and ride on the lower corner edge thereof until the lip 34 snaps against the adjacent wall of said opening to retain said shoulder 33 in its most effective fastening position. Said shoulder 33 may be more sharp or pronounced as necessary or desirable for engaging an increased area of the support adjacent the opening 5, but when provided in the manner of a cam shoulder, as shown, is advantageously adapted to engage supports of various thicknesses and otherwise compensate for manufacturing variations and discrepancies such as burrs around the fastener opening, etc.

At the same time the shank is thus pulled axially, it is also forced laterally as necessary to distort the shank leg 31 around the corner of the opening adjacent thereto, thereby forming a bend defining a shoulder 38 which positively locks the fastener shank in said opening in cooperation with the cam shoulder 33. It will be understood that the necessary axial movement of the fastener shank takes place simultaneously with a flattening of the spring arms 35 from the position of Fig. 8 to that of Fig. 9 and this also distends the fastener body in a manner to urge the attaching portions 36 outwardly into firm, rigid engagement with the sides of the molding which is usually sufficiently resilient to yield as necessary for any compensation in this respect.

In such applied fastening position, the shank legs 31, 32, being initially of a spacing greater than the size of the opening as shown in Fig. 7, are maintained in said opening under compression which provides a continuously effective expansive spring force on the preformed cam shoulder 33 and the cooperating bent shoulder 38 defined by the distortion of the shank leg 31, as aforesaid. The shank legs 31, 32 of the fastener are thus locked at spaced points in the opening under spring tension in cooperation with the spring force of the spring arms 35 and attaching portions 36 in resilient interlocked relation with the molding, thereby securing the same to the support under continuously effective spring tension throughout. This is most important in installations subject to frequent shock and jarring effects, as for example, in the case of a molding mounted on refrigerator door of the type generally closed by slamming action against the door jamb. Previous forms of clip fasteners have been found to fail to remain in place under such conditions, but this difficulty is overcome by the fastener of the present invention which, by reason of the aforesaid securing action under spring tension throughout, is adapted to yield as necessary to become adapted to such shock and jarring effects without loosening or otherwise becoming removed from applied fastening position.

Figs. 11 to 13 inclusive show a further embodiment of the invention wherein another form of the fastener which is generally similar in construction, operation and use to that just described is provided for mounting an object such as a rod R, tube, cable or the like, onto an apertured support F. The body 40 of the fastener has struck and formed therefrom a similar, integral strip-like section which is bent to form the shank leg 41 and cooperating yieldable leg 42, the extremity of which is provided with a bent portion defining the cam shoulder 43 and cooperating lip or shoulder 44 in the form of a substantial hook, or the like. Adjacent shank leg 41, a portion of said strip is bent to define a spring arm connecting portion 45 extending from the fastener body 40 in a direction generally normal to the shank of the fastener and connecting the same to suitable attaching means provided on said body for engaging the object to be secured to the support, as in the manner of bent attaching portions 46 formed from one end of said body.

The fastener is initially applied substantially as shown in Fig. 11 to hold the object in its proper assembled relation on the support F, with the fastener shank received in the opening 7 therein but without the locking shoulder 43 extending through said opening. The fastener shank is then actuated axially either upon pressure on the spring arm 45 or by a tool applied to the loop of the shank in a manner whereby the shank leg 41 is distorted to define the shoulder 48 cooperating with the cam shoulder 43 to lock the fastener in the opening in the support substantially as described with reference to Figs. 7 to 10 inclusive. In either case, the yieldable spring arm 45 is forcibly moved from the position of Fig. 11 to that of Fig. 12 wherefore the object R is resiliently retained on the support by the attaching portion 46, while the fastener shank is locked in the opening in the support under continuously effective spring tension by the cam shoulder 43 cooperating with the shoulder 48 formed by the distortion of the shank leg 41, as aforesaid.

While the invention has been described in detail with specific examples, such examples are intended as illustrations only, since it will be apparent to those skilled in the art that other modifications in the construction, arrangement and general combination of parts thereof may be devised without departing from the spirit and scope of the invention. The present embodiments are therefore to be considered in all respects as illustrative and not restrictive, the scope of the invention being indicated by the appended claims rather than by the foregoing description, with all changes falling within the scope, meaning and range of equivalency of the claims intended to be embraced therein.

What is claimed is:

1. A locking fastener for securing an object or part to a supporting part through an opening in said supporting part, said fastener including a strip of metal having a bent portion providing a shank comprising a leg member and a locking element yieldable with respect thereto and defining a shoulder normally spaced from said leg member a distance greater than the size of said opening in the supporting part, a resilient spring arm portion connected to said shank and extending at an angle thereto to support said shank for substantially axial movement to final applied fastening position in said opening, and means associated with said resilient spring arm portion for attaching the fastener to the part to be secured to said supporting part, said shank of the fastener in the assembled relation of said parts being receivable in the opening in the supporting part without the shoulder defined by the yieldable element thereof passing through said opening, said resilient spring arm portion permitting said shank to be thereupon actuated generally axially to pass said shoulder through said opening to locked relation with said supporting part, and said leg member of the shank being adapted to be distorted incidental to such actuation to define a shoulder cooperating with said shoulder on the yieldable element in said locked relation in the opening.

2. A locking fastener for securing an object or part to a supporting part through an opening in said supporting part, said fastener including a strip of metal having a bent portion providing a shank comprising a leg member and a locking element yieldable with respect thereto and defining a shoulder normally spaced from said leg member a distance greater than the size of said opening in the supporting part, a resilient spring arm portion connected to said shank and extending at an angle thereto support said shank for substantially axial movement to final applied fastening position in said opening, and an attaching portion connected to said resilient spring arm portion for attaching the fastener to the part to be secured to said supporting part, said shank of the fastener in the assembled relation of said parts, being receivable in the opening in the supporting part without the shoulder defined by the yieldable element thereof passing through said opening, said resilient spring arm portion permitting said shank to be thereupon actuated generally axially to pass said shoulder through said opening to locked relation with said supporting part, and said leg member of the shank being adapted to be distorted incidental to such actuation to define a shoulder cooperating with said shoulder on the yieldable element in said locked relation in the opening.

3. A locking fastener for securing an object or part to a supporting part through an opening in said supporting part, said fastener including a strip of metal having a bent portion providing a shank comprising a leg member and a locking element yieldable with respect thereto and defining a shoulder normally spaced from said leg member a distance greater than the size of said opening in the supporting part, a resilient spring arm portion formed from an extension to said leg member of the shank and extending at an angle generally normal thereto to support said shank for substantially axial movement to final applied fastening position in said opening, and an attaching portion connected to said resilient spring arm portion for attaching the fastener to the part to be secured to said supporting part, said shank of the fastener in the assembled relation of said parts, being receivable in the opening in the supporting part without the shoulder defined by the yieldable element thereof passing through said opening, said resilient spring arm portion permitting said shank to be thereupon actuated generally axially to pass said shoulder through said opening to locked relation with said supporting part, said leg member of the shank being adapted to be distorted incidental to such actuation to define a shoulder cooperating with said shoulder on the yieldable element in said locked relation in the opening.

4. A locking fastener for securing an object or part to a supporting part through an opening in said supporting part, said fastener including a strip of sheet metal of a width receivable in said opening and having a bent portion providing a shank comprising a leg member and a locking element, said locking element being yieldable with respect to said leg member and defining a shoulder normally spaced from said leg member a distance greater than the size of said opening in the supporting part, a resilient spring arm portion comprising a spring arm formed from an extension of said leg member and extending at an angle generally normal thereto to support said shank for substantially axial movement to final applied position in said opening, and means carried by said spring arm for attaching the fastener to the part to be secured to said supporting part, said shank of the fastener in the assembled relation of said parts, being receivable in the opening in the supporting part without the shoulder defined by the yieldable element thereof passing through said opening, said resilient spring arm portion permitting said shank to be thereupon actuated generally axially to pass said shoulder through said opening to locked relation with said supporting part, said resilient spring arm portion otherwise being designed to maintain said shoulder in such locked relation with the supporting part under tension in a reverse generally axial direction, and said leg member of the shank being adapted to be distorted incidental to such actuation to define a shoulder cooperating with said shoulder on the yieldable element in said locked relation in the opening.

5. A locking fastener for securing an object or part to a supporting part through an opening in said supporting part, said fastener including a strip of metal having a bent portion providing a shank comprising a leg member and a locking element yieldable with respect thereto and defining a shoulder terminating in a cooperating projection and normally spaced from said leg member a distance greater than the size of said opening in the supporting part, a resilient spring arm portion connected to said shank and extending at an angle thereto to support said shank for substantially axial movement to final applied fastening position in said opening, and means associated with said resilient spring arm portion for attaching the fastener to the part to be secured to said supporting part, said shank of the fastener in the assembled relation of said parts being receivable in the opening in the supporting part without the shoulder defined by the yieldable element thereof passing through said opening, said resilient spring arm portion permitting said shank to be thereupon actuated generally axially to pass said shoulder through said opening and dispose said cooperating projection in engagement with the adjacent wall of said opening in locked relation with said supporting part, and said leg member of the shank being adapted to be distorted incidental to such actuation to define a shoulder cooperating with said shoulder on the yieldable element in said locked relation in the opening.

6. A locking fastener for securing an object or part to a supporting part through an opening in said supporting part, said fastener including a strip of metal having a bent portion providing a shank comprising a leg member and a locking element yieldable with respect thereto and defining a shoulder terminating in a cooperating lip and normally spaced from said leg member a distance greater than the size of said opening in the supporting part, a resilient spring arm portion connected to said shank and extending at an angle thereto to support said shank for substantially axial movement to final applied fastening position in said opening, and an attaching portion formed from an extension of said spring arm portion for attaching the fastener to the part to be secured to said supporting part, said shank of the fastener in the assembled relation of said parts being receivable in the opening in the supporting part without the shoulder defined by the yieldable element thereof passing through said opening, said resilient spring arm portion permitting said shank to be thereupon actuated generally axially to pass said shoulder through said opening to locked relation with said supporting part and with said cooperating lip engaging the adjacent wall of said opening to retain said shoulder in such locked relation, and said leg member of the shank being adapted to be distorted incidental to such actuation to define a shoulder cooperating with said shoulder on the yieldable element in said locked relation in the opening.

7. A locking fastener for securing an object or part to a supporting part through an opening in said supporting part, said fastener including a strip of metal having a bent portion providing a shank comprising a leg member and a locking element yieldable with respect thereto provided with a shoulder defined by a substantial hook and normally spaced from said leg member a distance greater than the size of said opening in the supporting part, a resilient spring arm portion connected to said shank and extending at an angle thereto to support said shank for substantially axial movement to final applied fastening position in said opening, and an attaching portion connected to said resilient spring arm portion for attaching the fastener to the part to be secured to said supporting part, said shank of the fastener in the assembled relation of said parts being receivable in the opening in the supporting part without the shoulder defined by said hook on the yieldable element passing through said opening, said resilient spring arm portion permitting said shank to be thereupon actuated generally axially to pass said shoulder through said opening to locked relation with said supporting part, and said leg member of the shank being adapted to be distorted incidental to such actuation to define a shoulder cooperating with said shoulder on the yieldable element in said locked relation in the opening.

GEORGE A. TINNERMAN.